United States Patent
Schütz et al.

(10) Patent No.: US 11,220,190 B2
(45) Date of Patent: Jan. 11, 2022

(54) MOBILE CHARGING STATION AND METHOD FOR CHARGING AN ELECTRIC TRANSPORTATION VEHICLE

(71) Applicants: VOLKSWAGEN AG, Wolfsburg (DE); KUKA AG, Augsburg (DE)

(72) Inventors: Daniel Schütz, Lehre/Essenrode (DE); Stephan Herold, Braunschweig (DE); Norbert Settele, Petersdorf-Willprechtszell (DE)

(73) Assignee: Volkswagen AG

( * ) Notice: Subject to any disclaimer, the term of this patent is extended or adjusted under 35 U.S.C. 154(b) by 0 days.

(21) Appl. No.: 16/762,329

(22) PCT Filed: Oct. 5, 2018

(86) PCT No.: PCT/EP2018/077170
§ 371 (c)(1),
(2) Date: May 7, 2020

(87) PCT Pub. No.: WO2019/091674
PCT Pub. Date: May 16, 2019

(65) Prior Publication Data
US 2020/0361329 A1 Nov. 19, 2020

(30) Foreign Application Priority Data
Nov. 10, 2017 (DE) ..................... 10 2017 220 017.0

(51) Int. Cl.
*B60L 53/00* (2019.01)
*B60L 53/57* (2019.01)
(Continued)

(52) U.S. Cl.
CPC ............. *B60L 53/57* (2019.02); *B60L 53/302* (2019.02); *B60L 53/305* (2019.02); *B60L 53/31* (2019.02); *B60L 53/35* (2019.02)

(58) Field of Classification Search
CPC ........ B60L 53/35; B60L 53/57; B60L 53/302; B60L 53/305; B60L 53/31; B60L 53/53;
(Continued)

(56) References Cited

U.S. PATENT DOCUMENTS 8,294,285 B2 * 10/2012 Hunter ...................... F03G 7/08
290/1 R
8,862,288 B2 * 10/2014 Vavrina ................... B60L 53/51
701/3
(Continued)

FOREIGN PATENT DOCUMENTS

DE 102009006982 A1 8/2009
DE 102014220256 A1 4/2016
(Continued)

OTHER PUBLICATIONS

Search Report for International Patent Application No. PCT/EP2018/077170; dated Jan. 11, 2019.

*Primary Examiner* — Naum Levin
(74) *Attorney, Agent, or Firm* — Barnes & Thornburg LLP

(57) ABSTRACT

A mobile charging station for the electric charging of electric transportation vehicles having at least one battery unit, at least one charging interface for charging the battery unit, at least one second interface for charging an electric transportation vehicle from the battery unit, a method or mechanism for automated navigation of the mobile charging station and a method or mechanism for receiving a charging request. A method for charging an electric transportation vehicle.

9 Claims, 3 Drawing Sheets

(51) Int. Cl.
*B60L 53/302* (2019.01)
*B60L 53/30* (2019.01)
*B60L 53/35* (2019.01)
*B60L 53/31* (2019.01)

(58) Field of Classification Search
CPC ...... B60L 53/14; B60L 53/80; B60L 2260/32; Y02T 90/12; Y02T 90/14; Y02T 90/16; Y02T 10/7072; Y02T 10/70
See application file for complete search history.

(56) References Cited

U.S. PATENT DOCUMENTS

| | | | | |
|---|---|---|---|---|
| 8,872,379 | B2* | 10/2014 | Ruiz | B60L 53/51 |
| | | | | 307/66 |
| 8,963,481 | B2* | 2/2015 | Prosser | B60L 1/006 |
| | | | | 320/104 |
| 9,056,555 | B1 | 6/2015 | Zhou | |
| 9,079,505 | B1* | 7/2015 | Hyde | B60L 58/10 |
| 9,085,302 | B2* | 7/2015 | Borroni-Bird | B62D 5/0418 |
| 9,555,715 | B2* | 1/2017 | Sugano | B60L 53/31 |
| 9,586,497 | B2* | 3/2017 | Epstein | B60L 58/24 |
| 9,592,742 | B1 | 3/2017 | Sosinov et al. | |
| 9,597,973 | B2* | 3/2017 | Penilla | G06Q 20/18 |
| 9,778,653 | B1 | 10/2017 | McClintock et al. | |
| 10,011,181 | B2* | 7/2018 | Dudar | B60L 53/39 |
| 10,183,563 | B2* | 1/2019 | Rayner | H02J 7/34 |
| 10,279,696 | B2* | 5/2019 | Dow | B60L 53/51 |
| 10,340,709 | B2* | 7/2019 | Dyer | B60L 53/53 |
| 10,373,238 | B2* | 8/2019 | Hill | B60L 53/80 |
| 10,391,872 | B2* | 8/2019 | Gaither | B60L 53/57 |
| 10,391,873 | B2 | 8/2019 | Köhnke | |
| 10,507,733 | B2* | 12/2019 | Blum | B60L 53/14 |
| 10,632,852 | B2* | 4/2020 | Ricci | B60L 3/0092 |
| 10,926,644 | B1* | 2/2021 | Willson | H02J 7/0021 |
| 2009/0149995 | A1 | 6/2009 | Kaneko et al. | |
| 2010/0039054 | A1* | 2/2010 | Young | B60W 20/13 |
| | | | | 318/376 |
| 2012/0005031 | A1* | 1/2012 | Jammer | B60L 53/305 |
| | | | | 705/16 |
| 2012/0303397 | A1* | 11/2012 | Prosser | B60L 53/00 |
| | | | | 705/7.12 |
| 2013/0338820 | A1* | 12/2013 | Corbett | B60L 53/35 |
| | | | | 700/232 |
| 2014/0097797 | A1* | 4/2014 | Hendrix | H01M 10/482 |
| | | | | 320/118 |
| 2014/0347017 | A1* | 11/2014 | Sugano | B60L 53/122 |
| | | | | 320/137 |
| 2014/0354229 | A1 | 12/2014 | Zhao et al. | |
| 2014/0360832 | A1 | 12/2014 | Aldrich | |
| 2017/0346322 | A1* | 11/2017 | Kuran | H02J 7/0031 |
| 2018/0001777 | A1* | 1/2018 | Kilic | B60L 53/37 |
| 2019/0001833 | A1* | 1/2019 | Coburn | H02J 7/342 |
| 2019/0009756 | A1* | 1/2019 | Jacobs | B60S 5/06 |
| 2019/0135133 | A1* | 5/2019 | Miller | B60L 53/14 |
| 2019/0210479 | A1* | 7/2019 | Bachmann | G05D 1/0225 |
| 2019/0217732 | A1* | 7/2019 | Zhou | B60L 53/14 |
| 2020/0086753 | A1* | 3/2020 | Hou | B60L 53/35 |
| 2021/0061125 | A1* | 3/2021 | Nasr | H02M 3/33584 |
| 2021/0101496 | A1* | 4/2021 | Brendel | G05D 1/0231 |

FOREIGN PATENT DOCUMENTS

| | | |
|---|---|---|
| DE | 102014226357 A1 | 6/2016 |
| DE | 102015213160 A1 | 1/2017 |
| DE | 1020015225789 A1 | 6/2017 |
| JP | H11285109 A | 10/1999 |
| WO | 2016203383 A1 | 12/2016 |

* cited by examiner

MOBILE CHARGING STATION AND METHOD FOR CHARGING AN ELECTRIC TRANSPORTATION VEHICLE

PRIORITY CLAIM

This patent application is a U.S. National Phase of International Patent Application No. PCT/EP2018/077170, filed 5 Oct. 2018, which claims priority to German Patent Application No. 10 2017 220 017.0, filed 10 Nov. 2017, the disclosures of which are incorporated herein by reference in their entireties.

SUMMARY

Illustrative embodiments relate to a mobile charging station and to a method for charging an electric transportation vehicle.

BRIEF DESCRIPTION OF THE DRAWINGS

Disclosed embodiments are explained in more detail below with reference to the drawings, in which.

DETAILED DESCRIPTION

Figure 1:
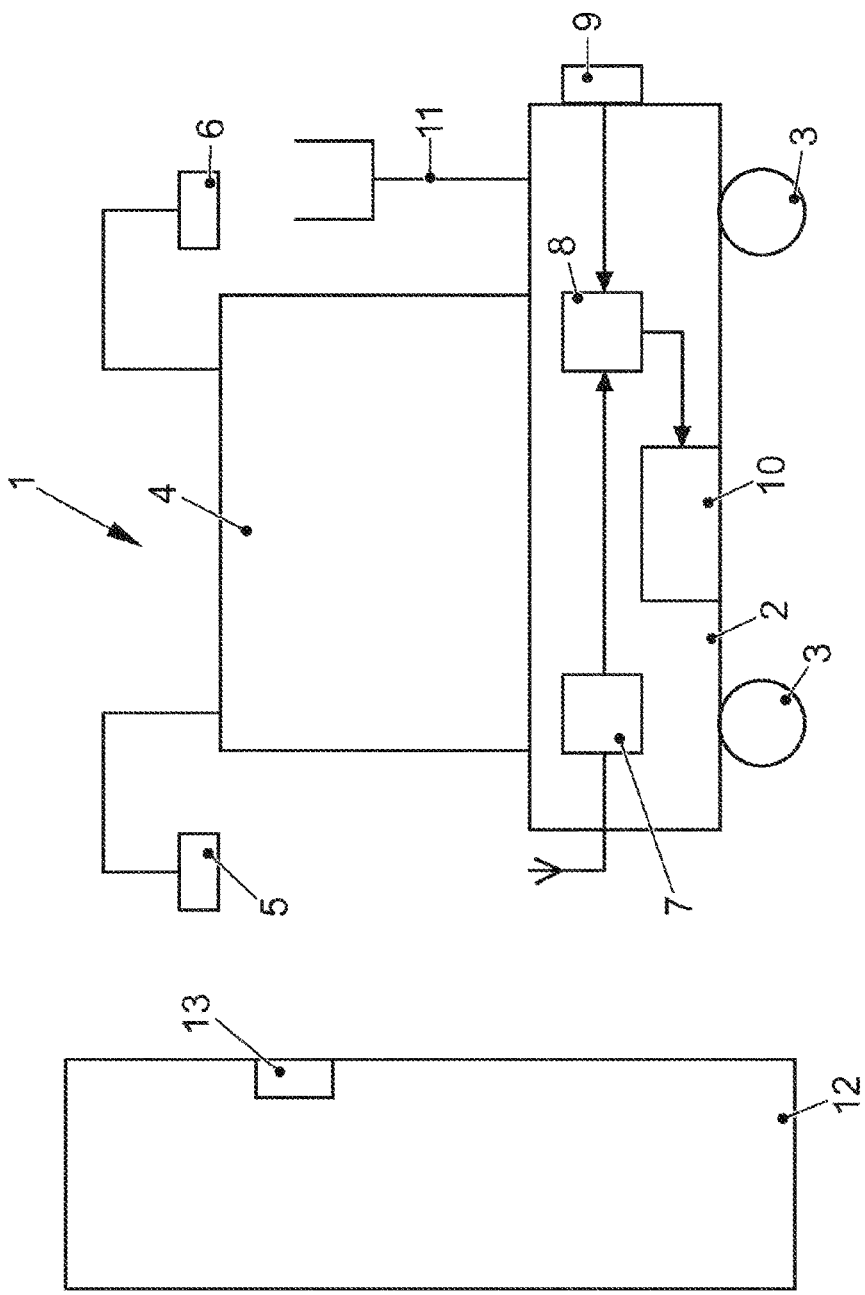
FIG. 1 shows an alternative illustration of a mobile charging station in a first embodiment.

One problem of electro-mobility is the provision of a sufficient charging infrastructure and the inconvenient process of plugging the charging plugs into corresponding charging sockets of the electric transportation vehicle.

Various approaches are known for solving these problems. For example, U.S. Pat. No. 9,056,555 B1 discloses a mobile charging robot which is electrically connected to a stationary charging post. The mobile robot can then move to a transportation vehicle and can automatically plug in the charging plug, in which case the transportation vehicle is then electrically charged by the stationary charging post. In this case, the robot can be directly supplied with electrical energy via the charging post or can have a battery unit which is charged via the stationary charging post.

DE 10 2014 226 357 A1 discloses a similar charging station for automatically charging an electrical energy store in a transportation vehicle, comprising a communication apparatus which is designed to receive vehicle-specific data from the transportation vehicle and to determine a position of a charging socket on the transportation vehicle using the received vehicle-specific data. The charging station also has a charging robot comprising a contact head having a plurality of contacts, wherein the contacts are connected to an electrical voltage source, wherein the charging robot is designed to approach a charging position on the basis of the determined position of the charging socket on the transportation vehicle and to insert the contact head into the charging socket of the transportation vehicle upon reaching the charging position and to electrically connect the contacts of the contact head and contacts of the charging socket.

The disclosed embodiments are based on the technical problem of further improving the charging process for electric transportation vehicles.

The technical problem is solved by a mobile charging station and a method.

For this purpose, the mobile charging station for electrically charging electric transportation vehicles comprises at least one battery unit, at least one first charging interface for charging the battery unit, at least one second interface for charging an electric transportation vehicle from the battery unit, methods or mechanisms for automatically navigating the mobile charging station, and methods or mechanisms for receiving a charging request.

The fundamental idea of the disclosed embodiments involves no longer providing the energy for the charging process by a stationary charging station but rather by a battery unit. This solves range problems which occur when the robot is wired to the stationary charging post. As a result, the mobile charging station can fundamentally be moved to any desired location, for example, in a parking garage or on the street. This considerably reduces the need for infrastructure and increases the flexibility since the transportation vehicles do not need to be parked in specially provided spaces.

In this case, it is noted that embodiments are possible in which the first and second interfaces are identical. The methods or mechanisms for receiving a charging request may have a wired interface or an air interface, in which case the charging request comprises at least one position of the transportation vehicle. However, the charging request may also already contain more information, for example, the desired charge amount etc. However, these data may also be interchanged locally when the mobile charging station has reached the transportation vehicle. The automatic navigation methods or mechanisms comprise, for example, cameras, laser scanners, ultrasonic sensors as environmental sensors and a control unit to locate and navigate the mobile charging station by a map.

In at least one disclosed embodiment, the mobile charging station has a robot arm which is designed in such a manner that the first charging interface can be automatically connected to a stationary charging post and/or the second interface can be automatically connected to a charging interface of a transportation vehicle, with the result that manually plugging-in is avoided. The mobile charging station may have a plurality of different first and second interfaces to be able to be used as flexibly as possible.

In a further disclosed embodiment, the mobile charging station has at least one electrical drive which is supplied by the battery unit. As a result, separate energy stores are dispensed with and the charging station has a somewhat simpler structure.

Alternatively, the mobile charging station can also have a modular structure. For this purpose, the mobile charging station has a mobile robot platform on which the battery unit is releasably arranged, wherein the robot platform has a further battery unit which is used to supply an electrical drive. In this case, the robot platform can approach the transportation vehicle, can unload the battery unit and can connect the second interface to the transportation vehicle by the robot arm. If further battery units are then releasably arranged on the robot platform, the robot platform can head for and charge further transportation vehicles. Otherwise, the robot platform moves back to the stationary charging post and obtains a new battery unit from there.

Alternatively, the mobile charging station can have a mobile robot platform and a passive platform which can be mechanically coupled to one another, wherein the mobile robot platform has at least one electrical drive which is supplied by a further battery unit, wherein the battery unit for charging an electric transportation vehicle is arranged on the passive platform. In this case, the robot platform moves the passive platform to the electric transportation vehicle, plugs the second interface into the transportation vehicle by the robot arm, releases the mechanical coupling and moves to a further transportation vehicle or back to the stationary charging station.

In the exemplary embodiments with a mobile robot platform, the robot arm may be arranged on the mobile robot platform.

In a further disclosed embodiment, a cooling device is assigned to the battery unit for charging an electric transportation vehicle to ensure high charging powers.

With regard to the configurations of the method and in a conditional manner, reference is made to the preceding statements.

FIG. 1 illustrates a mobile charging station 1 having a platform 2 with wheels 3. A battery unit 4 which is designed with at least one first charging interface 5 for charging the battery unit 4 and with at least one second charging interface 6 for charging an electric transportation vehicle (not illustrated) is arranged on the platform 2. The mobile charging station 1 also has means 7 for receiving a charging request. The mobile charging station 1 also has automatic navigation methods or mechanisms comprising at least one control unit 8 and environmental sensors 9. The mobile charging station 1 also has an electrical drive 10 and a robot arm 11 which can be controlled by methods or mechanisms of a controller (not illustrated). In this case, the means 7, control unit 8, environmental sensors 9, electrical drive 10 and robot arm 11 are electrically supplied by the battery unit 4. Alternatively, a further battery unit for supplying the components may also be provided. In this case, it is noted that caterpillar tracks or Mecanum wheels can also be used instead of wheels 3.

The battery unit 4 is first of all charged by a stationary charging station 12 connected to an AC network, for example, for which purpose the first charging interface 5 is plugged into a corresponding charging interface 13 of the stationary charging station 12 by the robot arm 11. If a charging request is then received from an electric transportation vehicle by the means 7, the first charging interface 5 is unplugged by the robot arm 11 if the battery unit 4 has sufficient charge and the mobile charging station 1 is automatically navigated to the electric transportation vehicle with the charging request. There, the robot arm 11 then plugs the second charging interface 6 into a charging interface of the electric transportation vehicle. A battery of the electric transportation vehicle is then charged by the battery unit 4. The mobile charging station 1 may have further control units which control the charging process (for example, charging current, charging power, payment etc.). If the charging process has been concluded, the robot arm 11 unplugs the second charging interface 6 and the mobile charging station 1 moves back to the stationary charging station 12 or to a further electric transportation vehicle.

Figure 2:
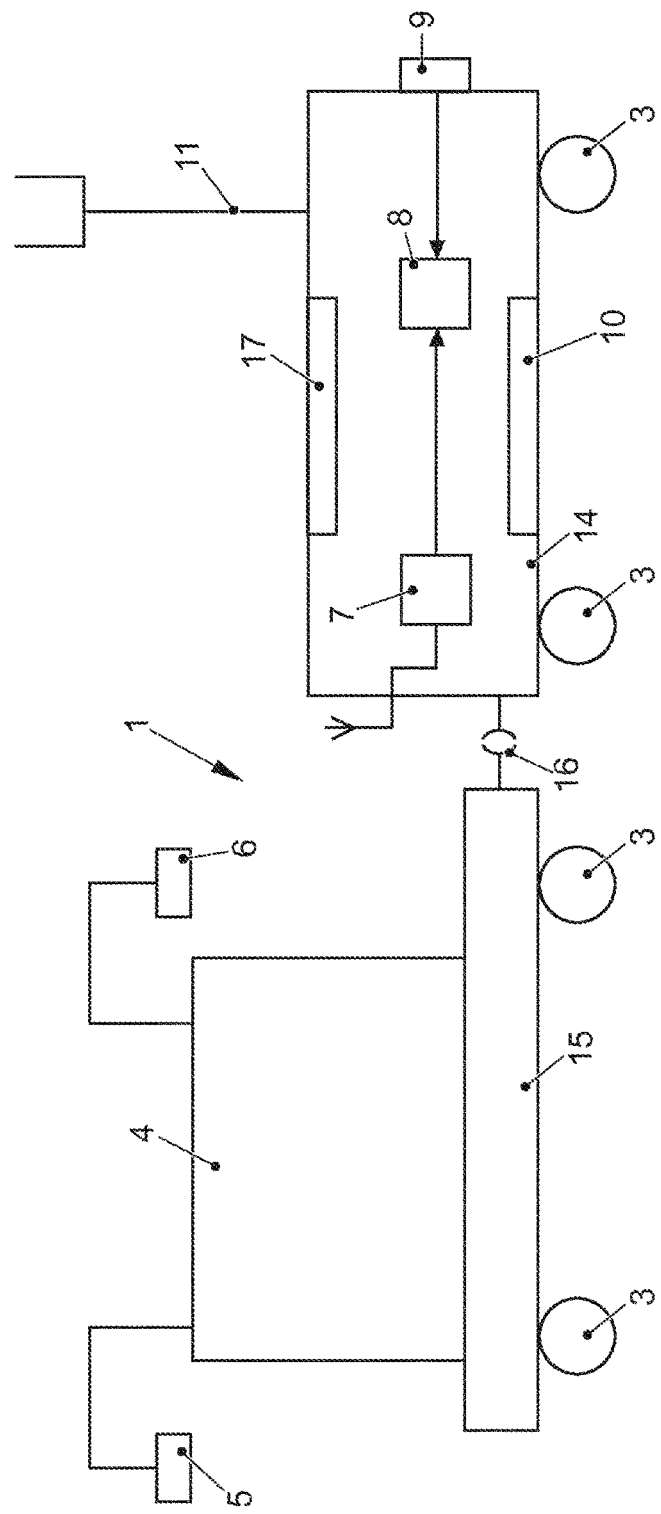
FIG. 2 shows an alternative illustration of a mobile charging station in a second embodiment.

FIG. 2 illustrates an alternative disclosed embodiment for a mobile charging station 1, in which case the same elements as in FIG. 1 are provided with the same reference signs. In contrast to the disclosed embodiment according to FIG. 1, the mobile charging station 1 has a mobile robot platform 12 and a passive platform 15 which can be releasably mechanically coupled to one another by a mechanical coupling 16. The mobile robot platform 14 navigates the passive platform 15 with the battery unit 4 to the electric transportation vehicle with the charging request, in which case the robot arm 11 then plugs the second charging interface 6 into a charging interface of the electric transportation vehicle again. The coupling 16 can then be released and the mobile robot platform 14 can move back to the stationary charging station to move a new passive platform to an electric transportation vehicle or to drag another parked passive platform to the stationary charging station. Since the mobile robot platform 14 is also intended to move without a battery unit 4, it has a further battery unit 17 which electrically supplies the components and, in particular, the drive 10.

Figure 3:
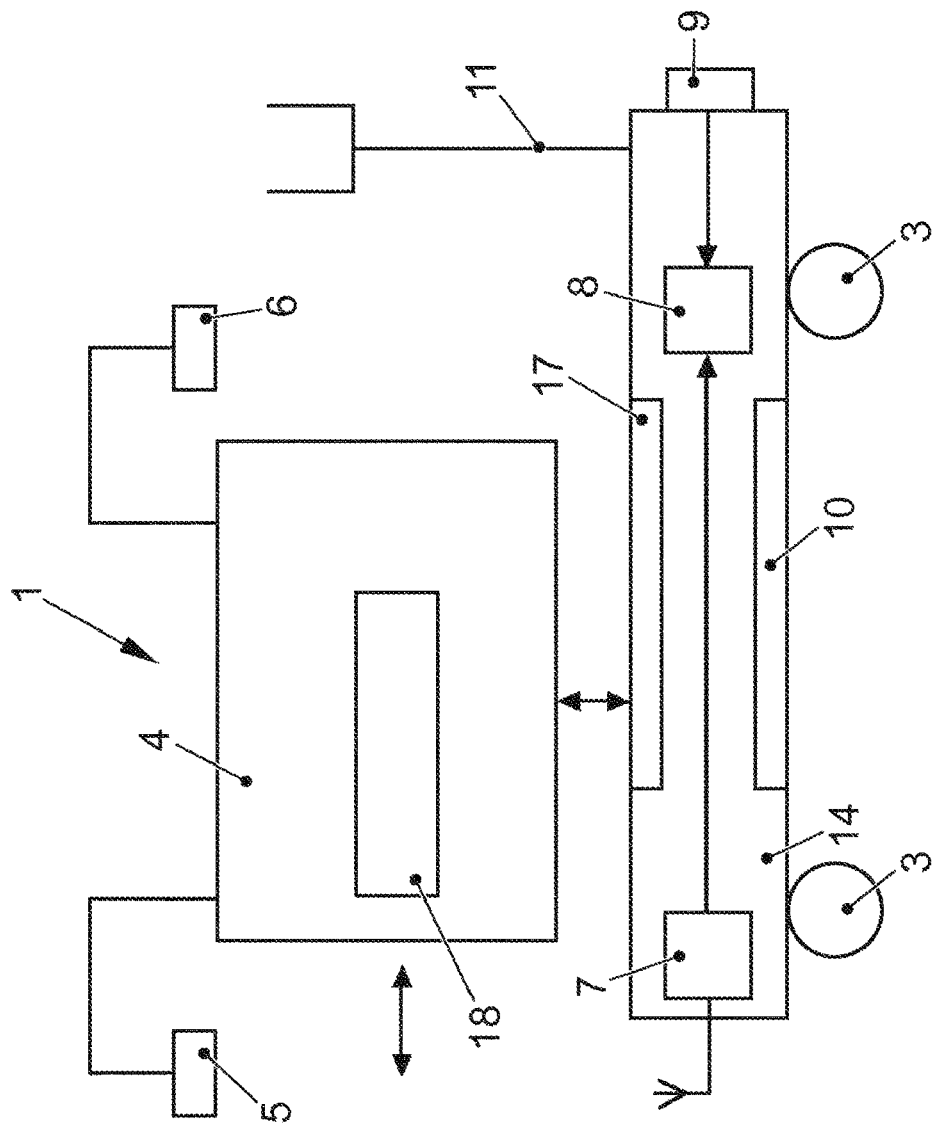
FIG. 3 shows an alternative illustration of a mobile charging station in a third embodiment.

FIG. 3 illustrates a further alternative disclosed embodiment for the mobile charging station 1, wherein the battery unit 4 is releasably arranged on the mobile robot platform 14, which is symbolized by the double-headed arrows. The battery unit 4 also has a cooling device 18 which may also be present in the preceding disclosed embodiments. The mobile robot platform 14 is loaded with a battery unit 4 at the stationary charging station and moves the battery unit to the electric transportation vehicle with a charging request. The second charging interface 6 is then plugged in and the battery unit 4 is placed onto the ground from the robot platform 14. The robot platform 14 can then move on and can pick up new battery units 4.

The invention claimed is:

1. A mobile charging station for electrically charging electric transportation vehicles, the mobile charging station comprising:

at least one battery unit;

at least one first charging interface for charging the at least one battery unit without removing the at least one battery unit from the mobile charging station;

at least one second interface for charging an electric transportation vehicle from the battery unit;

means for automatically navigating the mobile charging station;

means for receiving a charging request; and a mobile robot platform and a passive platform which are mechanically coupled to one another via a coupler, wherein the mobile robot platform has at least one electrical drive supplied by a further battery unit, wherein the battery unit for charging an electric transportation vehicle is arranged on the passive platform, and wherein a robot arm, the at least one first charging interface, and the at least one second charging interface are arranged on the mobile robot platform, wherein the mobile robot platform is configured to navigate the passive platform to the electric transportation vehicle, to automatically connect the second interface to the charging interface of the electric transportation vehicle, to decouple the coupler so as to decouple the passive platform from the mobile robot platform, and to navigate a further passive platform to a further electric transportation vehicle in response to the electric transportation vehicle being charged by the passive platform.

2. The mobile charging station of claim 1, wherein the robot arm is configured to automatically connect the at least one first charging interface to a stationary charging station configured to charge the at least one battery unit and to and/or automatically connect the second interface to a charging interface of an electric transportation vehicle.

3. The mobile charging station of claim 1, wherein the at least one battery unit is releasably arranged on the mobile robot platform, and wherein the mobile robot platform has a further battery unit used to supply an electrical drive.

4. The mobile charging station of claim 1, further comprising a cooling device assigned to the battery unit.

5. The mobile charging station of claim 1, wherein the mobile robot platform is further configured to drag a parked passive platform to the stationary charging station, and wherein the robot arm is configured to automatically connect the first charging interface to the stationary charging station configured to charge at least one further battery unit arranged on the parked passive platform.

6. A method for charging an electric transportation vehicle by a mobile charging station, the method comprising:
receiving a charging request; and
automatically navigating the mobile charging station to an electric transportation vehicle with the charging request, wherein the mobile station is not connected to a stationary charging station during navigation and a subsequent charging process,
wherein the mobile charging station includes at least one battery unit, at least one first charging interface for charging the at least one battery unit without removing the at least one battery unit from the mobile charging station, and at least one second interface for charging the electric transportation vehicle from the at least one battery unit,
wherein the mobile charging station includes a mobile robot platform and a passive platform which are mechanically coupled to one another, wherein the mobile robot platform has at least one electrical drive supplied by a further battery unit, wherein the battery unit for charging an electric transportation vehicle is arranged on the passive platform, and wherein a robot arm, at least one first charging interface, and the at least one second charging interface are arranged on the mobile robot platform, and
wherein the mobile robot platform is configured to navigate the passive platform to the electric transportation vehicle, to automatically connect the second interface to the charging interface of the electric transportation vehicle, to decouple the coupler so as to decouple the passive platform from the mobile robot platform, and to navigate a further passive platform to a further electric transportation vehicle in response to the electric transportation vehicle being charged by the passive platform.

7. The method of claim 6, wherein the robot arm is configured to automatically connect the at least one first charging interface to a stationary charging station configured to charge the at least one battery unit and to automatically connect the second interface to a charging interface of an electric transportation vehicle.

8. The method of claim 6, wherein wherein the at least one battery unit is releasably arranged on the mobile robot platform and includes a further battery unit used to supply an electrical drive.

9. The method of claim 6, wherein the mobile robot platform is further configured to drag a parked passive platform to the stationary charging station, and wherein the robot arm is configured to automatically connect the first charging interface to the stationary charging station configured to charge at least one further battery unit arranged on the parked passive platform.

* * * * *